United States Patent [19]

Harris et al.

[11] Patent Number: 4,793,852
[45] Date of Patent: Dec. 27, 1988

[54] PROCESS FOR THE RECOVERY OF NON-FERROUS METAL SULFIDES

[75] Inventors: Guy H. Harris, Concord, Calif.; Patrice K. Ackerman, Kent, Wash.; Frank F. Aplan, State College, Pa.

[73] Assignee: The Dow Chemical Company, Midland, Mich.

[21] Appl. No.: 791,803

[22] Filed: Oct. 28, 1985

[51] Int. Cl.$^4$ ............................................. C22B 1/00
[52] U.S. Cl. ................................ 75/2; 423/26; 423/53; 423/89; 423/99; 423/138; 209/166; 558/244; 558/245
[58] Field of Search ................. 423/26, 53, 89, 99, 423/138; 75/2; 209/166; 260/455 B

[56] References Cited

FOREIGN PATENT DOCUMENTS 403441 5/1972 U.S.S.R. ............................ 423/26

Primary Examiner—Robert L. Stoll
Attorney, Agent, or Firm—Norman L. Sims

[57] ABSTRACT

This invention relates to a method of recovering non-ferrous metal sulfides from a metal ore which comprises subjecting the metal ore, in the form of an aqueous pulp, to a froth flotation process in the presence of a flotating amount of a flotation collector wherein the collector comprises a compound which corresponds to one of the formulas

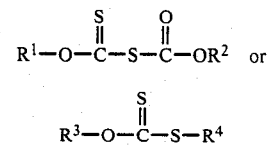

wherein $R^1$ is alkyl, aryl or aralkyl group wherein the aryl and aralkyl can be substituted with a halo or alkyl moiety;

$R^2$ is alkyl, aryl or aralkyl group wherein the aryl or aralkyl can be substituted with a halo or alkyl moiety;

$R^3$ is aryl or aralkyl unsubstituted or substituted with a halo or alkyl moiety;

$R^4$ is alkyl, aryl or aralkyl group wherein the aryl or aralkyl can be substituted with a halo or alkyl moiety; with the proviso that at least one of $R^1$ and $R^2$ must be aryl or aralkyl unsubstituted or substituted;

under conditions such that the metal sulfide values are recovered in the froth.

The collectors of this process are useful under alkaline, neutral and acidic conditions. Such collectors give good recoveries of the mineral sulfide values, with a high selectivity toward the non-ferrous metal sulfide values over the ferrous containing minerals.

The novel collectors of this invention result in surprisingly high recovery of nonferrous metal values or sulfidized metal oxide values, and a surprisingly high selectivity toward such nonferrous metal values when such metal values are found in the presence of ferrous-containing metal sulfides. These collectors demonstrate good recovery and good kinetics.

9 Claims, No Drawings

PROCESS FOR THE RECOVERY OF NON-FERROUS METAL SULFIDES

BACKGROUND OF THE INVENTION

This invention relates to a process useful for the recovery of non-ferrous metal sulfide values from mineral ores by froth flotation.

Flotation is a process of treating a mixture of finely divided mineral solids, e.g., a pulverulent ore, suspended in a liquid whereby a portion of such solids is separated from other finely divided mineral solids, e.g., clays and other like materials present in the ore, by introducing a gas (or providing a gas in situ) in the liquid to produce a frothy mass containing certain of the solids on the top of the liquid, and leaving suspended (unfrothed) other solid components of the ore. Flotation is based on the principle that introducing a gas into a liquid containing solid particles of different materials suspended therein causes adherence of some gas to certain suspended solids and not to others and makes the particles having the gas thus adhere thereto lighter than the liquid. Accordingly, these particles rise to the top of the liquid to form a froth.

Various flotation agents have been admixed with the suspension to improve the frothing process. Such added agents are classed according to the function to be performed: collectors, for sulfide minerals including xanthates, thionocarbamates and the like; frothers which impart the property of forming a stable froth, e.g., natural oils such as pine oil and eucalyptus oil; modifiers such as activators to induce flotation in the presence of a collector, e.g., copper sulfate; depressants, e.g., sodium cyanide, which tend to prevent a collector from functioning as such on a mineral which it is desired to retain in the liquid, and thereby discourage a substance from being carried up and forming a part of the froth; pH regulators to produce optimum metallurgical results, e.g., lime, soda ash and the like.

It is of importance to bear in mind that additives of the hereinbefore described types are selected for use according to the nature of the ore, the mineral sought to be recovered, and the other additaments which are to be used in combination therewith.

An understanding of the phenomena which makes flotation a particularly valuable industrial operation is not essential to the practice of the present invention. They appear, however, to be largely associated with selective affinity of the surface of particulated solids, suspended in a liquid containing entrapped gas, for the liquid on the one hand, the gas on the other.

The flotation principle is applied in a number of mineral separation processes among which is the selective separation of such minerals as sulfide copper minerals, sulfide zinc minerals, sulfide molybdenum minerals and others from sulfide iron minerals.

Among collectors commonly used for the recovery of mineral values are xanthates, dithiophosphates, and thionocarbamates. When the ferrous-containing sulfide minerals are recovered in flotation processes along with the mineral values, there is excess sulfur present which is released in the smelting processes resulting in an undesirably high amount of sulfur present during the smelting operations. These volatile sulfur compounds are often released to the atmosphere through smokestacks, or are removed from such smokestacks by expensive and elaborate scrubbing equipment. Many nonferrous metal sulfides or metal oxides are found naturally in the presence of ferrous-containing sulfide ores.

Of the commercial collectors, the xanthates, thionocarbamates, and dithiophosphates do not selectively recover nonferrous metal values in the presence of ferrous sulfides. On the contrary, such collectors collect and recover all metal sulfides.

In many flotation processes the pH must be controlled to achieve the recovery of the desired minerals. Many of such processes give good recoveries under alkaline conditions and require the addition of large amounts of lime. This adds significant costs to such processes.

What is needed is a flotation process which will selectively recover the nonferrous metal sulfide values in the presence of ferrous sulfides. What is further needed is a collector which will selectively recover non-ferrous metal sulfides values under neutral and acidic conditions.

Furthermore, what are needed are collectors which give high rates of recovery of the metal sulfide values along with good selectivities towards the metal sulfide values over the gangue, that is, the undesired portions of the mineral ore.

SUMMARY OF THE INVENTION

This invention relates to a method of recovering non-ferrous metal sulfides from a metal ore which comprises subjecting the metal ore, in the form of an aqueous pulp, to a froth flotation process in the presence of a flotating amount of a flotation collector wherein the collector comprises a compound which corresponds to one of the formulas

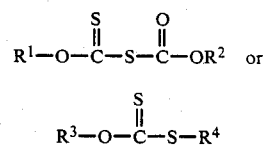

wherein
- R$^1$ is alkyl, aryl or aralkyl group wherein the aryl and aralkyl can be substituted with a halo or alkyl moiety;
- R$^2$ is alkyl, aryl or aralkyl group wherein the aryl or aralkyl can be substituted with a halo or alkyl moiety;
- R$^3$ is aryl or aralkyl unsubstituted or substituted with a halo or alkyl moiety;
- R$^4$ is alkyl, aryl or aralkyl group wherein the aryl or aralkyl can be substituted with a halo or alkyl moiety; with the proviso that at least one of R$^1$ and R$^2$ must be aryl or aralkyl unsubstituted or substituted;

under conditions such that the metal sulfide values are recovered in the froth.

The collectors of this process are useful under alkaline, neutral and acidic conditions. Such collectors give good recoveries of the mineral sulfide values, with a high selectivity toward the non-ferrous metal sulfide values over the ferrous containing minerals.

The novel collectors of this invention result in surprisingly high recovery of nonferrous metal values or sulfidized metal oxide values, and a surprisingly high selectivity toward such nonferrous metal values when such metal values are found in the presence of ferrous-containing metal sulfides. These collectors demonstrate good recovery and good kinetics.

DETAILED DESCRIPTION OF THE INVENTION

The collectors useful in this invention demonstrate good activity under neutral, acidic and alkaline conditions. In the process of this invention the aqueous pulp is preferably at a pH of between about 2 and 12. In one more preferred embodiment, the aqueous pulp is at a pH of between about 2 and 6.

With respect to the collectors of the formula

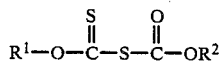

where $R^1$, $R^2$, or both are aryl or aralkyl, the collectors demonstrate good activity at under acidic and neutral conditions. With respect to the collectors of the formula

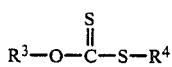

where $R^3$ is aryl or aralkyl such collectors demonstrate good activity under acidic and neutral conditions.

$R^1$ is preferably $C_{1-10}$ alkyl, $C_{6-10}$ aryl, or $C_{7-10}$ aralkyl, wherein the $C_{6-10}$ aryl and the $C_{7-10}$ aralkyl may be substituted with a halo or alkyl moiety. $R^1$ is more preferably $C_{2-6}$ alkyl, phenyl or benzyl. $R^1$ is most preferably propyl, isopropyl, phenyl or benzyl. $R^2$ is preferably $C_{1-10}$ alkyl, $C_{7-10}$ aralkyl or $C_{6-10}$ aryl, wherein the $C_{6-10}$ aryl and the $C_{7-10}$ aralkyl may substituted with a halo or alkyl moiety. $R^2$ is more preferably $C_{2-6}$ alkyl, phenyl or benzyl. $R^2$ is most preferably isopropyl, propyl, phenyl or benzyl. $R^3$ is preferably $C_{6-10}$ aryl or $C_{7-10}$ aralkyl, wherein the $C_{6-10}$ aryl or the $C_{7-10}$ aralkyl may be substituted with a halo or alkyl moiety. $R^3$ is more preferably phenyl or benzyl. $R^4$ is preferably $C_{1-10}$ alkyl, $C_{7-10}$ aralkyl or $C_{6-10}$ aryl, wherein the $C_{6-10}$ aryl or the $C_{7-10}$ aralkyl may be substituted with a halo or alkyl moiety. $R^4$ is more preferably a $C_{1-6}$ alkyl, phenyl or benzyl moiety. $R^4$ is most preferably $C_{1-3}$ alkyl, phenyl or benzyl.

The term aryl refers herein to biaryl, biphenylyl, phenyl, naphthyl, phenanthrenyl, anthracenyl and two aryl groups bridged by an alkylene group. Aralkyl means herein an aryl substituted alkyl group, wherein aryl is as defined hereinbefore.

$C_{1-10}$ alkyl includes straight- and branched-chain methyl, ethyl, propyl, butyl, pentyl, hexyl, heptyl, octyl, nonyl and decyl groups.

The process of this invention is useful for the recovery by froth flotation of metal sulfide values from metal ores. A metal ore refers herein to the metal as it is taken out of the ground and includes the metal values in admixture with the gangue. Gangue refers herein to those materials which are of little or no value and need to be separated from the metal values. This process can be used to recover metal sulfide values.

Sulfide ores for which these compositions are useful include copper sulfide-, zinc sulfide-, molybdenum sulfide-, cobalt sulfide-, nickel sulfide-, lead sulfide-, arsenic sulfide-, silver sulfide-, chromium sulfide-, gold sulfide-, platinum sulfide- and uranium sulfide-containing ores. Examples of sulfide ores from which metal sulfides may be concentrated by froth flotation using the process of this invention include copper-bearing ores such as, for example, covellite (CuS), chalcocite ($Cu_2S$), chalcopyrite ($CuFeS_2$), valleriite ($Cu_2Fe_4S_7$ or $Cu_3Fe_4S_7$), tetrahedrite ($Cu_3SbS_2$), bornite ($Cu_5FeS_4$), cubanite ($Cu_2SFe_4S_5$), enargite ($Cu_3(As_1Sb)S_4$), tennantite ($Cu_{12}As_4S_{13}$), brochantite ($Cu_4(OH)_6SO_4$), antlerite ($Cu_3SO_4(OH)_4$), famatinite ($Cu_3(SbAs)S_4$), and bournonite ($PbCuSbS_3$); lead-bearing ores such as, for example, galena (PbS); antimony-bearing ores such as, for example, stibnite ($Sb_2S_3$); zinc-bearing ores such as, for example, sphalerite (ZnS); silver-bearing ores such as, for example, stephanite ($Ag_5SbS_4$), and argentite ($Ag_2S$); chromium-bearing ores such as, for example, daubreelite ($FeSCrS_3$); and platinum- and palladium-bearing ores such as, for example, cooperite ($Pt(AsS)_2$).

In a preferred embodiment of this invention copper sulfide, nickel sulfide, lead sulfide, zinc sulfide or molybdenum sulfide values are recovered. In a more preferred embodiment copper sulfide and zinc sulfide values are recovered. In an even more preferred embodiment, copper sulfide values are recovered.

The collectors of this invention can be used in any concentration which gives the desired recovery of the desired metal values. In particular, the concentration used is dependent upon the particular metal value to be recovered, the grade of the ore to be subjected to the froth flotation process and the desired quality of the metal value to be recovered. Preferably, the collectors of this invention are used in concentrations of 0.001 kg to 1.0 kg per metric ton of ore, more preferably between about 0.010 and 1.0 kg per metric ton, and even more preferably between about 0.010 kg and 0.2 kg of collector per metric ton of ore to be subjected to froth flotation.

Frothers are preferably used in the froth flotation process of this invention. Any frother well-known in the art, which results in the recovery of the desired metal value is suitable. Frothers useful in this invention include any frothers known in the art which give the recovery of the desired mineral value. Examples of such frothers include $C_{5-8}$ alcohols, pine oils, cresols, $C_{1-4}$ alkyl ethers of polypropylene glycols, dihydroxylates of polypropylene glycols, glycols, soaps and the like. Furthermore, blends of such frothers may also be used. All frothers which are suitable for beneficiation of mineral sulfide ores by froth flotation can be used in this invention.

Further, in the process of this invention it is contemplated that collectors of this invention can be used in mixtures with other collectors well-known in the art. Collectors, known in the art, which may be used in admixture with the collectors of this invention are those which will give the desired recovery of the desired mineral value. Examples of collectors useful in this invention include alkyl monothiocarbonates, alkyl dithiocarbonates, alkyl trithiocarbonates, dialkyl dithiocarbamates, alkyl thionocarbamates, monoalkyl dithiophosphates, dialkyl and diaryl dithiophosphates, dialkyl monothiophosphates, dialkyl thioureas, dialkyl and diaryl thiophosphonyl chlorides, dialkyl and diaryl dithiophosphonates, alkyl mercaptans, xanthogen formates, xanthate esters, mercapto benzothiazoles, and salts of fatty acids, alkyl sulfuric acids and salts thereof, alkyl and alkaryl sulfonic acids and salts thereof, alkyl phosphoric acids and salts thereof, alkyl and aryl phosphoric acids and salts thereof, sulfosuccinates, sulfosuccinamates, primary amines, secondary amines, tertiary amines, quaternary ammonium salts, alkyl pyridinium salts, guanidine, and alkyl propylene diamines.

SPECIFIC EMBODIMENTS

The following examples are included for illustration and do not limit the scope of the invention or claims. Unless otherwise indicated, all parts and percentages are by weight.

In the following examples, the performance of the frothing processes described is shown by giving the rate constant of flotation and the amount of recovery at infinite time. These numbers are calculated by using the formula $$\gamma = R_\infty \left[ 1 - \frac{1 - e^{-kt}}{kt} \right]$$

wherein: $\gamma$ is the amount of mineral recovered at time t, k is the rate constant for the rate of recovery and $R_\infty$ is the calculated amount of the mineral which would be recovered at infinite time. The amount recovered at various times is determined experimentally and the series of values are substituted into the equation to obtain the $R_\infty$ and k. The above formula is explained in Klimpel, "Selection of Chemical Reagents for Flotation", Chapter 45, pp. 907–934, *Mineral Processing Plant Design*, 2nd Ed., 1980, AIME (Denver) (incorporated herein by reference).

EXAMPLE 1

Froth Flotation of Copper Sulfide

In this example several of the collectors of this invention are tested for flotation of copper sulfide values. A 500-g quantity of an Arizona copper sulfide ore (chalcopyrite) is placed in a rod mill and ground to produce a size distribution of 25 percent less than 100 mesh. A quantity of lime is also added to the rod mill, based on the desired pH for the subsequent flotation. The ground slurry is transferred to a 1500 ml cell of Agitair Flotation machine. The float cell is agitated at 1150 rpm and the pH is adjusted by the addition of further lime.

The collector is added to the float cell followed by a conditioning time of one minute, at which time the frother, DOWFROTH® 250 is added (30 g/metric ton). After the additional one-minute conditioning time, the air to the float cell is turned on at a rate of 4.5 liters per minute and the automatic froth removal paddle is started. The froth samples were taken off at 0.5, 1.5, 3, 5 and 8 minutes. The froth samples are dried overnight in an oven, along with the flotation tailings. The dried samples are weighed, divided into suitable samples for analysis, pulverized to insure suitable fineness and dissolved in acid for metal analysis. The results are compiled in Table I.

EXAMPLE 2

A Central Canadian copper sulfide ore is subjected to froth flotation. The frother used is DOWFROTH® 1263 at a concentration of 0.00625 lb/ton (3.12 g/metric ton). The collectors are used at a concentration of 0.0625 lb/ton (31.2 g/metric ton). The froths produced are recovered at 0.5, 1.0, 2.0, 4.0, 7.0, 11.0, and 16.0 minutes. The results are compiled in Table II with collectors chosen from Table I.

TABLE I
RESULTS OF A COPPER ORE FROM ARIZONA
(All Collectors at 0.02 kg/t)

| Reagent | pH | Copper | | | Pyrite | | | Selectivity Ratio |
|---|---|---|---|---|---|---|---|---|
| | | K | $R_\infty$ | $R_8$ | K | $R_\infty$ | $R_8$ | |
| Isopropyl Xanthogen Phenyl Formate | 5 | 12.7 | .961 | .953 | 13.3 | .834 | .826 | 1.2 |
| Isopropyl Xanthogen Phenyl Formate | 10.5 | 13.6 | .973 | .967 | 9.84 | .874 | .877 | 1.1 |
| Benzyl Xanthogen Ethyl Formate | 5 | 8.58 | .925 | .909 | 6.28 | .302 | .296 | 3.1 |
| Benzyl Xanthogen Ethyl Formate | 10.5 | 5.98 | .902 | .901 | 3.29 | .372 | .369 | 2.4 |
| O—benzyl S—methyl Xanthate | 5 | 9.24 | .923 | .910 | 2.44 | .228 | .213 | 4.3 |
| O—benzyl S—methyl Xanthate | 10.5 | 10.0 | .947 | .935 | 2.31 | .161 | .152 | 6.0 |

TABLE II
RESULTS OF COPPER ORE FROM CENTRAL CANADA*

| | Result | Copper | | | | | Pyrrhotite | | | | | Gangue | | | | |
|---|---|---|---|---|---|---|---|---|---|---|---|---|---|---|---|---|
| | | 1.0 Min | 3.0 Min | 6.0 Min | 12.0 Min | Tot/Ave | 1.0 Min | 3.0 Min | 6.0 Min | 12.0 Min | Tot. | 1.0 Min | 3.0 Min | 6.0 Min | 12.0 Min | Tot. |
| O—benzyl S—methyl Xanthate | Rec | 58.0 | 22.2 | 6.3 | 3.8 | 90.3 | 4.2 | 2.6 | 1.9 | 3.0 | 11.7 | .65 | .60 | .39 | .60 | 2.24 |
| | Grade | 20.9 | 14.1 | 8.5 | 4.2 | 15.1 | — | — | — | — | — | — | — | — | — | — |

What is claimed is:

1. A method of recovering non-ferrous metal sulfides from a metal ore which comprises subjecting the metal ore, in the form of an aqueous pulp, to a froth flotation process in the presence of a flotating amount of between about 0.001 and 1.0 kg per metric ton of ore of a flotation collector wherein the collector comprises a compound which corresponds to the formula

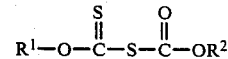

wherein
 $R^1$ is alkyl, aryl, or aralkyl group wherein the aryl or aralkyl is unsubstituted or substituted with a halo or alkyl moiety, and;
 $R^2$ is alkyl, aryl, or aralkyl group wherein the aryl or aralkyl is unsubstituted or substituted with a halo or alkyl moiety;

with the proviso that at least one of $R^1$ and $R^2$ must be aryl or aralkyl unsubstituted or substituted;

under conditions such that the metal sulfide values are recovered in the froth.

2. The process of claim 1 wherein
$R^1$ is $C_{1-10}$ alkyl, $C_{6-10}$ aryl, or $C_{7-10}$ aralkyl, wherein the $C_{6-10}$ aryl and the $C_{7-10}$ aralkyl is unsubstituted or substituted with a halo or alkyl moiety;
$R^2$ is $C_{1-10}$ alkyl, $C_{7-10}$ aralkyl, or $C_{6-10}$ aryl, wherein the $C_{6-10}$ aryl and the $C_{7-10}$ alkaryl is unsubstituted or substituted with a halo or alkyl moiety.

3. The process of claim 2 wherein
$R^1$ is $C_{2-6}$ alkyl, phenyl, or benzyl;
$R^2$ is $C_{2-6}$ alkyl, phenyl, or benzyl.

4. The process of claim 3 wherein the non-ferrous metal sulfide is copper sulfide, nickel sulfide, lead sulfide, zinc sulfide or molybdenum sulfide.

5. The process of claim 4 wherein the non-ferrous metal sulfide is copper sulfide or zinc sulfide.

6. The process of claim 5 wherein the non-ferrous metal sulfide is copper sulfide.

7. The process of claim 4 wherein the pH of the aqueous pulp is between about 2 and 12.

8. The process of claim 7 wherein the pH of the aqueous pulp is between about 2 and 6.

9. The process of claim 7 wherein a flotating amount of the collector is between about 0.010 and 1.0 kg per metric ton.

* * * * *